(12) United States Patent
Wang et al.

(10) Patent No.: US 9,589,371 B2
(45) Date of Patent: Mar. 7, 2017

(54) SOLAR HEAT POWER GENERATION SYSTEM AND DETECTION DEVICE FOR CONDENSER REFLECTING SURFACE THEREOF

(75) Inventors: Shuhui Wang, Xiangtan (CN); Minhui Wang, Xiangtan (CN); Yuelei Zhang, Xiangtan (CN); Mi Mou, Xiangtan (CN); Yueying Li, Xiangtan (CN); Xuegao Fu, Xiangtan (CN)

(73) Assignees: Xiangtan Liyuan Electric Tooling Co., Ltd. (CN); Xiangtan Electric Manufacturing Co., Ltd. (CN)

( * ) Notice: Subject to any disclaimer, the term of this patent is extended or adjusted under 35 U.S.C. 154(b) by 417 days.

(21) Appl. No.: 14/238,661

(22) PCT Filed: Apr. 27, 2012

(86) PCT No.: PCT/CN2012/074834
§ 371 (c)(1),
(2), (4) Date: Feb. 12, 2014

(87) PCT Pub. No.: WO2013/053223
PCT Pub. Date: Apr. 18, 2013

(65) Prior Publication Data
US 2014/0192186 A1    Jul. 10, 2014

(30) Foreign Application Priority Data

Oct. 9, 2011    (CN) .......................... 2011 1 0304539

(51) Int. Cl.
*G06T 7/60*    (2006.01)
*F24J 2/10*    (2006.01)
(Continued)

(52) U.S. Cl.
CPC ................ *G06T 7/602* (2013.01); *F03G 6/06* (2013.01); *F24J 2/10* (2013.01); *F24J 2/5233* (2013.01);
(Continued)

(58) Field of Classification Search
CPC .. F24J 2/10; F24J 2/5233; Y02E 10/46; Y02E 10/47; F03G 6/06; G06T 7/602; H04N 7/18
(Continued)

(56) References Cited

U.S. PATENT DOCUMENTS 5,982,481 A     11/1999  Stone et al.
RE37,215 E  *   6/2001   Dammeyer ........... B66F 9/0755
                                              187/222
(Continued)

FOREIGN PATENT DOCUMENTS

CN    101251439 A    8/2008
CN    201476954 U    5/2010
(Continued)

OTHER PUBLICATIONS

Zhang. "CN 101046386 Translated Full Text". Oct. 2007.*
(Continued)

*Primary Examiner* — Christopher S Kelley
*Assistant Examiner* — Zhihan Zhou
(74) *Attorney, Agent, or Firm* — Lerner, David, Littenberg, Krumholz & Mentlik, LLP

(57) ABSTRACT

A detection device for a condenser reflecting surface of a solar heat power generation system comprises: a horizontal rotary beam disposed above the condenser reflecting surface and capable of rotating in a horizontal surface, a plurality of laser heads being disposed at the bottom end of the horizontal rotary beam, a receiving disk perpendicular to the central axis of the horizontal rotary beam and capable of vertical movement connected at the theoretical focus of the
(Continued)

condenser reflecting surface below the horizontal rotary beam, a camera being disposed below the receiving disk. A solar heat power generation system comprises the condenser reflecting surface and the detection device, and the detection device is disposed right above the condenser reflecting surface.

16 Claims, 7 Drawing Sheets

(51) Int. Cl.
    *F24J 2/52*     (2006.01)
    *F03G 6/06*     (2006.01)
    *H04N 7/18*     (2006.01)

(52) U.S. Cl.
    CPC ............... *H04N 7/18* (2013.01); *Y02E 10/46* (2013.01); *Y02E 10/47* (2013.01)

(58) Field of Classification Search
    USPC ........................................ 348/135; 60/641.15
    See application file for complete search history.

(56) References Cited

U.S. PATENT DOCUMENTS

| 7,520,684 | B2* | 4/2009 | Ingalls | ............. | G08B 13/19623 348/373 |
|---|---|---|---|---|---|
| 2010/0002237 | A1 | 1/2010 | Zalusky | | |
| 2010/0199972 | A1* | 8/2010 | Brost | ..................... | F24J 2/1052 126/601 |
| 2011/0267421 | A1* | 11/2011 | Sutter, Jr. | ............... | H04N 7/142 348/14.12 |
| 2012/0002039 | A1* | 1/2012 | Moriarty | .............. | G01B 11/005 348/131 |

FOREIGN PATENT DOCUMENTS

| CN | 201583253 U | 9/2010 |
|---|---|---|
| CN | 102023083 A | 4/2011 |
| CN | 102331239 A | 1/2012 |
| JP | 62055502 | 3/1987 |
| JP | 09189545 | 7/1997 |
| JP | 10199915 | 7/1998 |
| JP | 11153407 | 6/1999 |
| WO | 02082037 A1 | 10/2002 |

OTHER PUBLICATIONS

He et al. "CN 201476954 Translated Full Text". May 2010.*
International Search Report for Application No. PCT/CN2012/075834 dated Jul. 19, 2012.

* cited by examiner ial Application No. PCT/CN2012/074834, titled "SOLAR HEAT POWER GENERATION SYSTEM AND DETECTION DEVICE FOR CONDENSER REFLECTING SURFACE THEREOF", filed on Apr. 27, 2012, which claims the benefit of priority to Chinese patent application No. 201110304539.2 titled "SOLAR THERMAL POWER GENERATION SYSTEM AND DETECTION DEVICE FOR REFLECTING SURFACE OF CONCENTRATOR THEREOF", filed with the Chinese State Intellectual Property Office on Oct. 9, 2011, both of which applications are incorporated herein in their entireties by this reference.

SOLAR HEAT POWER GENERATION SYSTEM AND DETECTION DEVICE FOR CONDENSER REFLECTING SURFACE THEREOF

The present application is the national phase of Internat

TECHNICAL FIELD

The present application relates to the technical field of solar power generation, and particularly to a detection device for a reflecting surface of a concentrator of a solar thermal power generation system. Furthermore, the present application further relates to a solar thermal power generation system having the detection device.

BACKGROUND

Solar energy is one of the important new energies in the future, and for both photovoltaic power generation and photothermal power generation, the solar energy with a low energy density has to be concentrated prior to use so as to improve the utilization efficiency, which is a mainstream development direction for the future solar energy development and utilization. There are various conventional light concentrating manners, such as a dish-type light concentrating manner, a groove-type light concentrating manner, a tower-type light concentrating manner, and a Fresnel light concentrating manner. The dish concentrator is particularly suitable for photothermal power generation due to its high concentration ratio and flexible arrangement, thus attracts wide attentions in recent years.

Since the sunlight has a relatively low energy density, and the light energy from the sunlight emitted on the earth surface is less than one kilowatt per square meter on average, thus in order to collect sufficient energy, the concentrator, including the dish concentrator, generally has a large light receiving area. The light collecting area is required to be increased as the scale of the photothermal power generation system gradually expands, thus the reflecting surface of the concentrator has an increasingly large area, and even has a diameter greater than 25 meters. It is difficult to detect such a huge device, being assembled, using conventional methods, particularly, it is extremely difficult to detect the actual shape and dimension of the most important reflecting surface, and an actual position of the focus of the reflecting surface is also difficult to determine, and it is even more difficult to obtain the energy density distribution rule of the sunlight collected by the dish concentrator in the focal spot.

In view of this, it is urgent to design a detection device for a reflecting surface of a concentrator for the solar thermal power generation system in the prior art, which may detect an actual shape of a rotating parabolic reflecting surface, and obtain the energy density distribution rule of the concentrated sunlight on a focused cross section, and may accurately locate the position of the focus of the reflecting surface of the dish concentrator, thereby greatly improving the match performance between the concentrator and a heat absorber.

SUMMARY

The technical problem to be solved by the present application is to provide a detection device for a solar thermal power generation system, which may detect an actual shape and a dimension of a reflecting surface of a concentrator, and obtain the energy density distribution rule of concentrated sunlight on a focused cross section, and may accurately locate the position of the focus of the reflecting surface of a dish concentrator, thereby greatly improving the match performance between the concentrator and a heat absorber. Another technical problem to be solved by the present application is to provide a solar thermal power generation system having the detection device for the reflecting surface of the concentrator.

For solving the above technical problems, the present application provides a detection device for a reflecting surface of a concentrator of a solar thermal power generation system which includes a horizontal rotating beam arranged above the reflecting surface of the concentrator and rotatable in a horizontal plane, wherein a bottom end of the horizontal rotating beam is provided with a plurality of laser heads, and a receiving disc, which is perpendicular to a central axis of the horizontal rotating beam and movable up and down, is connected to the horizontal rotating beam at a position corresponding to a theoretical focus position of the reflecting surface of the concentrator, and a camera is arranged below the receiving disc.

Preferably, the horizontal rotating beam includes a rotating sleeve arranged at a middle portion of the horizontal rotating beam and a main beam fixedly connected between two sides of the horizontal rotating beam, an upper end of the rotating sleeve is connected to a connecting cylinder and rotatable with respect to the connecting cylinder in the horizontal plane, and a left transverse beam and a right transverse beam are respectively arranged at two sides of the connecting cylinder, and a left longitudinal beam and a right longitudinal beam both supported on the ground are respectively connected below an outer side of the left transverse beam and an outer side of the right transverse beam.

Preferably, an upper portion of the rotating sleeve is provided with a lower supporting sleeve, a first bevel gear is arranged outside the lower supporting sleeve and engages with a second bevel gear, and the second bevel gear is connected to a swing transmission mechanism of the detection device.

Preferably, the swing transmission mechanism includes a plurality of link mechanisms connected by universal joints and arranged inside the left transverse beam and the left longitudinal beam, one end of the link mechanism inside the left longitudinal beam is connected to a handwheel via a second bevel gear assembly, and the other end of the link mechanism inside the left transverse beam is connected to the first bevel gear.

Preferably, the handwheel is provided with a pointer, and a dial coaxial with the pointer is arranged at a rear portion of the handwheel; a transmission ratio of a first bevel gear assembly consisted of the first bevel gear and the second bevel gear is the reciprocal of a transmission ratio of the second bevel gear assembly, and a transmission ratio of each universal joint is 1.

Preferably, an upper portion of the connecting cylinder is provided with a top cover, the top cover is provided with an upper supporting sleeve, and a sliding rod is vertically slidably connected to the upper supporting sleeve via a sliding key, and is coaxially arranged inside the rotating sleeve, and has a lower end portion fixedly connected to the receiving disc.

Preferably, a rack is arranged on the sliding rod and engages with a gear, and the gear is connected to a lift transmission mechanism of the detection device.

Preferably, each of the left transverse beam and the right transverse beam is provided with a pulling cord holder, and the pulling cord holder is provided with a pulley assembly, both ends of each of the left transverse beam and the right transverse beam are connected with a pulling cord via the pulley assembly, and the pulling cord is tensioned via a tensioner.

Preferably, each of the left longitudinal beam and the right longitudinal beam is supported on a herringbone beam, a transverse pulling rod is arranged between two supporting legs of the herringbone beam, and two sides of a bottom end of each supporting leg are connected with two caster assemblies each having an adjustable height.

Preferably, each of the caster assemblies includes a floating shaft sleeve having two cylindrical structures, and a first cylindrical structure is fixedly connected to a caster via a caster shaft; a fixing sleeve is vertically slidably connected to an outer portion of a second cylindrical structure, and an inner portion of the second cylindrical structure is threadedly connected with a rotating shaft.

Preferably, an upper end of the fixing sleeve is arranged with a snap cap, and an upper end of the rotating shaft is articulated to a rocking rod via a horizontal articulating shaft, and an edge of the snap cap is provided with a snap groove for snappingly mounting the rocking rod in a case that the rocking rod is put down.

With such structure, firstly the reflecting surface of the concentrator is placed on a stand stably with an opening facing upwards and is adjusted to be at a horizontal position, the whole detection device is arranged above the reflecting surface of the concentrator, and the horizontal rotating beam is remained in a horizontal state and located at a position right above the reflecting surface of the concentrator. At this time, a first laser head arranged at the outermost side of the horizontal rotating beam is started to emit one laser beam on the reflecting surface of the concentrator, and after being reflected, the laser beam falls on the receiving disc and forms a mark on a lower surface of the receiving disc, and at this time, the camera right below the receiving disc captures the mark and transmits the picture to a computer, and then after analyzing the picture, the computer obtains a position of the mark on the receiving disc. Then, the first laser head is turned off, a second laser head is started, the camera captures a second picture, and a position of a second mark is obtained and recorded, and the above operations are repeated till all of the laser heads has worked once. Then, the horizontal rotating beam is driven to rotate by a certain angle within a horizontal plane, and the above steps are performed again until all of the laser heads has worked once, then the horizontal rotating beam is rotated again by a certain angle, and the above operations are repeated till the horizontal rotating beam has rotated for one circle, or is reset after rotating by 180 degrees and then is driven to rotate reversely by 180 degrees and then is reset, in this way, the whole reflecting surface may be detected once.

In this process, if a laser beam at a position does not form a mark on a receiving surface of the receiving disc, or forms a mark exceeding a specified radius range, it illustrates that the tolerance of the reflecting surface at this position exceeds the allowable range in the design.

Furthermore, in the above detection process, the probabilities of each mark appeared at different positions of the receiving disc are counted, and after analysis, the energy density distribution rule of the sunlight being concentrated by the reflecting surface of the concentrator in the focal spot may be obtained. In addition, all of the laser heads on the horizontal rotation beam are started to form a row of marks on the receiving surface of the receiving disc. The receiving disc is adjusted up and down, and the position where the receiving disc is located when the marks on the receiving surface have a minimized distribution range is the focus of the reflecting surface of the concentrator.

As illustrated in the above operation process, with the detection device having the above structure, the computer performs a calculation and fitting to obtain the actual shape and dimension of the rotating parabolic reflecting surface based on the relationship among the receiving disc, the laser heads and positions of the laser beams falling on the receiving disc. Furthermore, the detection device may also measure the energy density distribution rule of the concentrated sunlight on a focused cross section conveniently, and locate the focus position of the reflecting surface of the disc concentrator accurately, thus is of a great significance for the matching between the reflecting surface of the disc concentrator and the heat absorber, and greatly increases the heat-absorbing efficiency of the solar thermal power generation system.

The present application further provides a solar thermal power generation system including a reflecting surface of a concentrator and further including a detection device for a reflecting surface of a concentrator as described above, wherein the detection device is arranged right above the reflecting surface of the concentrator.

Since the detection device for the reflecting surface of the concentrator has the above technical effects, the solar thermal power generation system including the detection device should also have the same technical effects, which will not be described herein.

Figure 1:
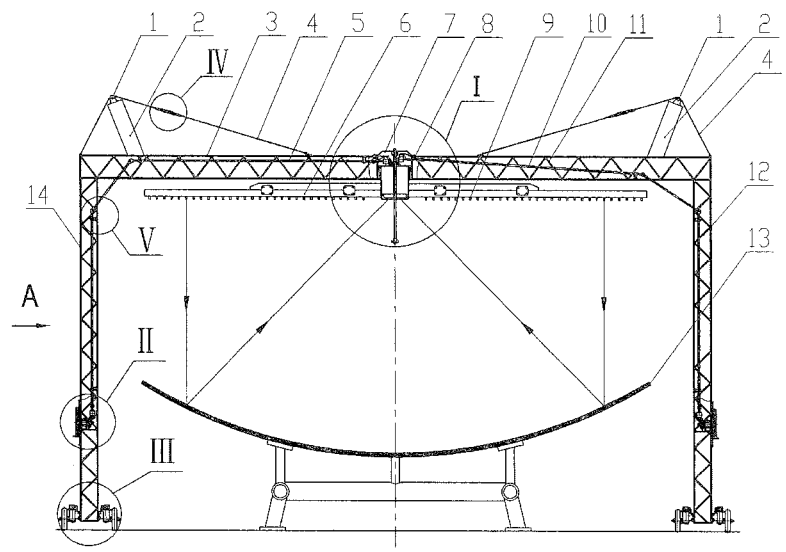
FIG. 1 is a front view of a detection device for a reflecting surface of a concentrator in a solar thermal power generation system according to the present application.

Corresponding relationships between reference numerals and components in FIGS. 1 to 13 are as follows: 1 pulley assembly, 2 pulling cord holder, 3 left transverse beam, 4 pulling cord, 5 swing transmission mechanism, 6 horizontal rotating beam, 7 top cover, 8 connecting sleeve, 9 laser head, 10 lift transmission mechanism, 11 right transverse beam, 12 right longitudinal beam, 13 reflecting surface of a concentrator, 14 left longitudinal beam, 15 herringbone beam, 16 pulling rod, 17 caster assembly, 18 first bearing seat, 19 first bevel gear assembly, 20 sliding key, 21 upper supporting sleeve, 22 locating ring, 23 fixing ring, 24 rotating sleeve, 25 sliding rod, 26 receiving disc, 27 camera holder, 28 camera, 29 universal joint, 30 second bearing seat, 31 second bevel gear assembly, 32 third bearing seat, 33 transmission shaft, 34 handwheel, 35 dial, 36 tensioner, 37 pointer, 38 gear, 39 rack, 40 castor shaft, 41 rotating shaft, 42 snap cap, 43 rocking rod, 44 fixing sleeve, 45 floating shaft sleeve, 46 mounting seat, and 47 lower support sleeve.

DETAILED DESCRIPTION

The present application provides a detection device for a reflecting surface of a concentrator in a solar thermal power generation system, which may detect an actual shape and a dimension of a reflecting surface of a concentrator, and obtain the energy density distribution rule of concentrated sunlight on a focused cross section, and may accurately locate the position of the focus of the reflecting surface of a dish concentrator, thereby greatly improving the match performance between the concentrator and a heat absorber. The present application further provides a solar thermal power generation system having the detection device for the reflecting surface of the concentrator.

For those skilled in the art to better understand technical solutions of the present application, the present application is described in detail in conjunction with drawings and embodiments hereinafter.

Reference is made to FIG. 1, which is a front view of a detection device for a reflecting surface of a concentrator in a solar thermal power generation system according to the present application.

In an embodiment, as shown in FIG. 1, the detection device for a reflecting surface of a concentrator in the solar thermal power generation system according to the present application includes a horizontal rotating beam 6 arranged above a reflecting surface 13 of a concentrator and rotatable in a horizontal plane. A bottom end of the horizontal rotating beam 6 is provided with a plurality of laser heads 9, and a receiving disc 26, which is perpendicular to a central axis of the horizontal rotating beam 6 and movable up and down, is connected to the horizontal rotating beam 6 at a position corresponding to a theoretical focus position of the reflecting surface 13 of the concentrator, and a camera 28 is arranged below the receiving disc 26.

With such structure, firstly the reflecting surface 13 of the concentrator is placed on a stand stably with an opening facing upwards and is adjusted to be at a horizontal position, the whole detection device is arranged above the reflecting surface 13 of the concentrator, and the horizontal rotating beam 6 is remained in a horizontal state and located at a position right above the reflecting surface 13 of the concentrator. At this time, a first laser head 9 arranged at the outermost side of the horizontal rotating beam 6 is started to emit one laser beam on the reflecting surface 13 of the concentrator, and after being reflected, the laser beam falls on the receiving disc 26 and forms a mark on a lower surface of the receiving disc 26, and at this time, the camera 28 right below the receiving disc 26 captures the mark and transmits the picture to a computer, and then after analyzing the picture, the computer obtains a position of the mark on the receiving disc 26. Then, the first laser head 9 is turned off, a second laser head 9 is started, the camera 28 captures a second picture, and a position of a second mark is obtained and recorded, and the above operations are repeated till all of the laser heads 9 has worked once. Then, the horizontal rotating beam 6 is driven to rotate by a certain angle within a horizontal plane, and the above steps are performed again until all of the laser heads 9 has worked once, then the horizontal rotating beam 6 is rotated again by a certain angle, and the above operations are repeated till the horizontal rotating beam 6 has rotated for one circle, or is reset after rotating by 180 degrees and then is driven to rotate reversely by 180 degrees and then is reset, in this way, the whole reflecting surface may be detected once. Apparently, the angle by which the horizontal rotating beam 6 rotates each time is determined based on the dimension of the reflecting surface 13 of the concentrator and the range of the surface error control, and can be determined by an user according to practical requirements.

In this process, if a laser beam at a position does not form a mark on a receiving surface of the receiving disc 26, or forms a mark exceeding a specified radius range, it illustrates that the tolerance of the reflecting surface at this position exceeds the allowable range in the design.

Furthermore, in the above detection process, the probabilities of each mark appeared at different positions of the receiving disc 26 are counted, and after analysis, the energy density distribution rule of the sunlight being concentrated by the reflecting surface 13 of the concentrator in the focal spot may be obtained.

In addition, all of the laser heads 9 on the horizontal rotation beam 6 are started to form a row of marks on the receiving surface of the receiving disc 26. The receiving disc 26 is adjusted up and down, and the position where the receiving disc 26 is located when the marks on the receiving surface have a minimized distribution range is the focus of the reflecting surface 13 of the concentrator.

As illustrated in the above operation process, with the detection device having the above structure, the computer performs a calculation and fitting to obtain the actual shape and dimension of the rotating parabolic reflecting surface based on the relationship among the receiving disc 26, the laser heads 9 and positions of the laser beams falling on the receiving disc 26. Furthermore, the detection device may also measure the energy density distribution rule of the concentrated sunlight on a focused cross section conveniently, and locate the focus position of the reflecting surface 13 of the disc concentrator accurately, thus is of a great significance for the matching between the reflecting surface 13 of the disc concentrator and the heat absorber, and greatly increases the heat-absorbing efficiency of the solar thermal power generation system.

It is to be noted that, the above embodiments do not limit the specific fixedly supporting manner of the horizontal rotating beam 6 and the specific rotatable connecting manner thereof in the horizontal plane, and do not limit the specific structural form of the receiving disc 26 movable up and down. Any detection devices, including the horizontal rotating beam 6 and the receiving disc 26, and capable of emitting the laser beams via the laser heads 9 located on the horizontal rotating beam 6 and reflecting the laser beams on the receiving disc 26, recording the positions of the marks via the camera 28 of the receiving disc 26, and obtaining the specific shape of the reflecting surface 13 of the concentrator through analysis, fall into the protection scope of the present application.

In addition, the term "outer" herein, indicating the directions and positions, refers to a direction spreading from the central axis of the reflecting surface 13 of the concentrator toward the left and right sides, i.e., a direction spreading from the vertical central line toward the left and right sides in FIG. 1; and the "inner" herein, indicating the directions and positions, refers to the opposite direction. It should be understood that, these terms indicating the directions and positions are defined based on the accompanying drawings, and should not be interpreted as limitation to the protection scope of the present application.

Figure 2:
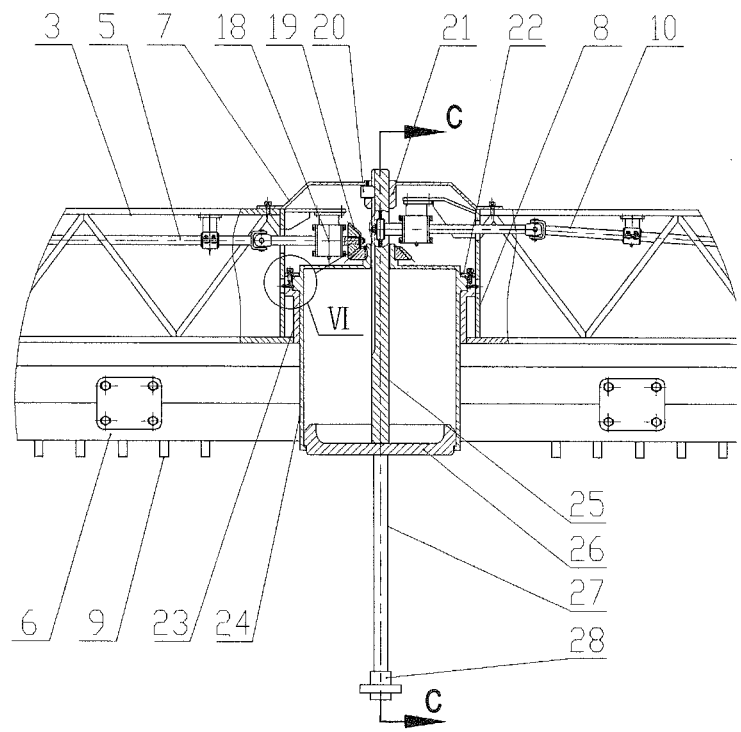
FIG. 2 is a partially enlarged view of portion I in FIG. 1.
Figure 3:
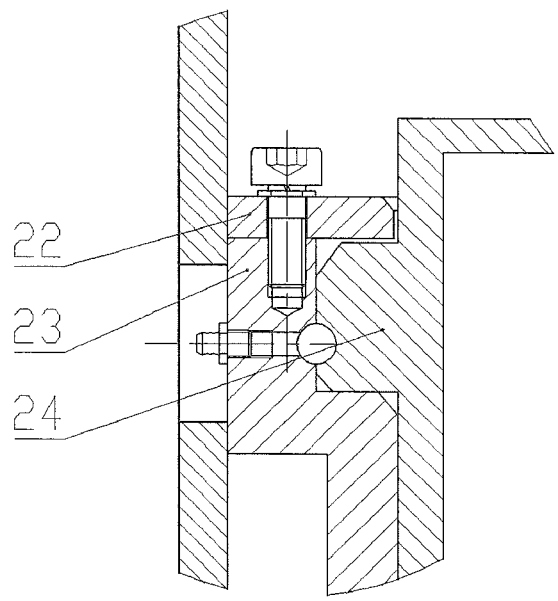
FIG. 3 is a partially enlarged view of portion VI in FIG. 2.
Figure 4:
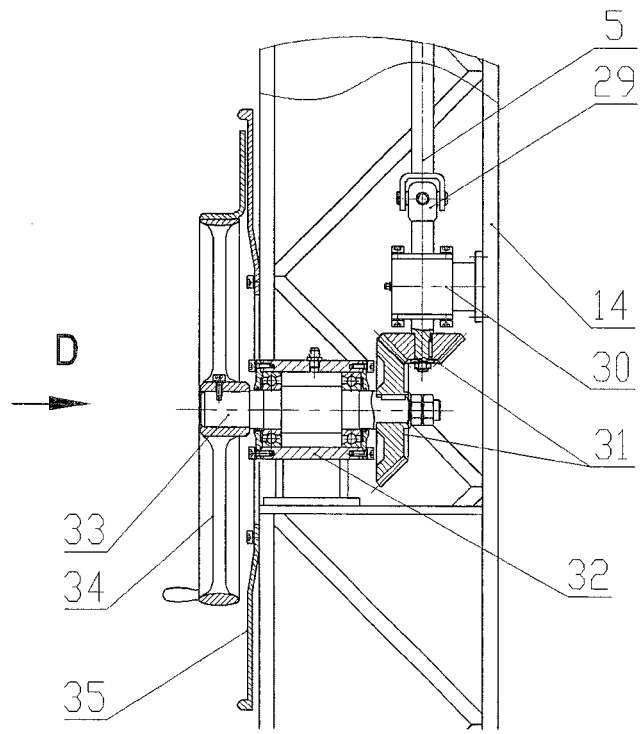
FIG. 4 is a partially enlarged view of portion II in FIG. 1.
Figure 5:
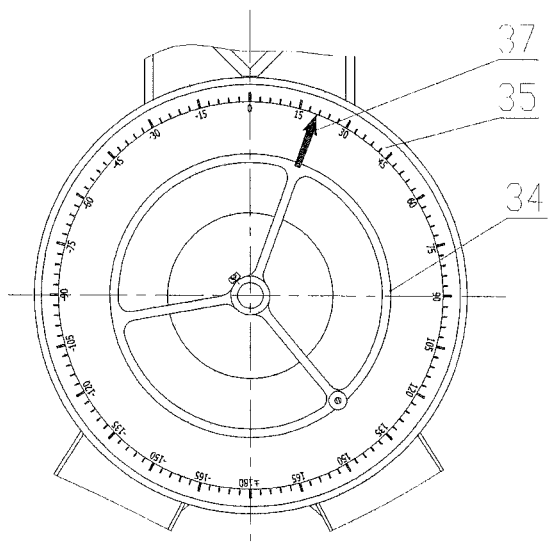
FIG. 5 is a view seen in a direction of D in FIG. 4.
Figure 6:
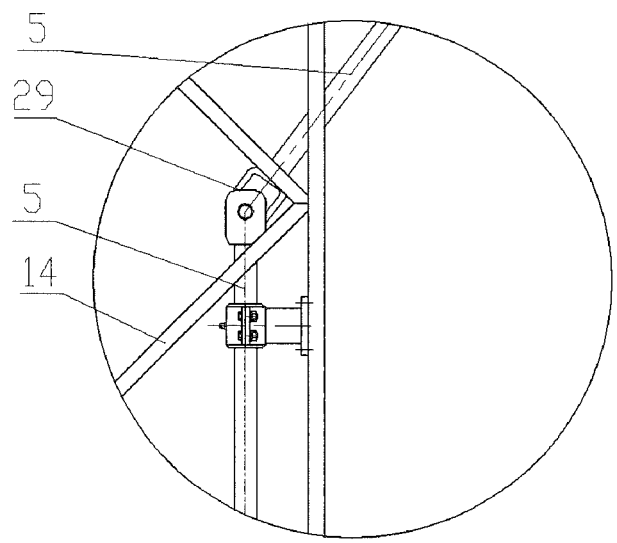
FIG. 6 is a partially enlarged view of portion V in FIG. 1.

Reference is made to FIGS. 2 to 6, FIG. 2 is a partially enlarged view of portion I in FIG. 1; FIG. 3 is a partially enlarged view of portion VI in FIG. 2; FIG. 4 is a partially enlarged view of portion II in FIG. 1; FIG. 5 is a view seen in a direction of D in FIG. 4; and FIG. 6 is a partially enlarged view of portion V in FIG. 1.

The fixedly supporting structure of the horizontal rotating beam 6 of the detection device and the rotatable connecting manner thereof in the horizontal plane may be further arranged.

In a specific solution, in conjunction with FIGS. 1 and 2, the horizontal rotating beam 6 may include a rotating sleeve 24 arranged at a middle portion thereof and a main beam fixedly connected between two sides thereof. An upper end of the rotating sleeve 24 may be connected to a connecting cylinder 8 and rotatable with respect to the connecting cylinder 8 in a horizontal plane, and a left transverse beam 3 and a right transverse beam 11 are respectively arranged at two sides of the connecting cylinder 8. A left longitudinal beam 14 and a right longitudinal beam 12 both supported on the ground are respectively connected below an outer side of the left transverse beam 3 and an outer side of the right transverse beam 11.

With such structure, bottom ends of the left longitudinal beam 14 and right longitudinal beam 12 are supported on the ground, and two transverse beams are supported on the longitudinal beams, thereby forming a door-shaped frame to fix and support the horizontal rotating beam 6. The rotatable connection between the connecting cylinder 8 and the rotating sleeve 24 may enable the horizontal rotating beam 6 to rotate with respect to the reflecting surface of the concentrator in the horizontal plane. This door-shaped frame has a simple structure and may provide stable support. Apparently, the supporting structure of the horizontal rotating beam 6 may also be realized in other forms.

A transmission mechanism for realizing the rotatable connection of the horizontal rotating beam 6 with respect to the left transverse beam 3 and the right transverse beam 11 may be further arranged.

In a further specific solution, as shown in FIG. 3, the rotating sleeve 24 is constrained by a fixing ring 23 and a locating ring 22 both arranged coaxially with the rotating sleeve 24, and is only rotatable about a central shaft and immovable up and down. An upper portion of the rotating sleeve is provided with a lower supporting sleeve 47, a first bevel gear is arranged outside the lower supporting sleeve 47 and engages with a second bevel gear, and the second bevel gear is connected to a swing transmission mechanism 5 of the detection device for the reflecting surface of the concentrator.

With the above structure, the swing transmission mechanism 5 of the detection device is started to transfer power to the second bevel gear, and the second bevel gear engaged with the first bevel gear drives the first bevel gear, thereby realizing the rotatable connection of the rotating sleeve 24 with respect to the connecting cylinder 8, i.e. enabling the horizontal rotating beam 6 to rotate with respect to the reflecting surface 13 of the concentrator in the horizontal plane.

As illustrated in the above operating process, a first bevel gear assembly 19 consisted of the first bevel gear and the second bevel gear may transfer movement smoothly, and vary the direction of power, thus the power of the swing transmission mechanism 5 may be conveniently transformed to a horizontal rotating torque of the horizontal rotating beam 6.

The swing transmission mechanism 5 of the detection device for the reflecting surface of the concentrator in the solar thermal power generation system may be further arranged. In an embodiment, as shown in FIGS. 4 to 6, the swing transmission mechanism 5 may include a plurality of link mechanisms connected by universal joints 29 and arranged inside the left transverse beam 3 and the left longitudinal beam 14. Inside the left longitudinal beam 14, one end of the link mechanism is connected to a handwheel 34 via a second bevel gear assembly 31, and the second bevel gear assembly 31 has one bevel gear connected to a second bearing seat 30, and another bevel gear connected to a transmission shaft 33 of the handwheel 34 via a third bearing seat 32, and inside the left transverse beam 3, the other end of the link mechanism is connected to the first bevel gear via a first bearing seat 18.

With such structure, when the horizontal rotating beam 6 is required to rotate in the horizontal plane, it is only required to manually rotate the handwheel 34 arranged at the left longitudinal beam 14, then the rotating force is transformed to a driving force for the first bevel gear inside the left transverse beam 3 via various connecting rods connected by the universal joints 29, and then the rotation of the horizontal rotating beam 6 may be achieved by the first bevel gear assembly 19.

Thus the swing transmission mechanism 5 has a simple structure and is convenient to operate, and since all components of the swing transmission mechanism 5, except for the handwheel 34, are arranged inside the left transverse beam 3 and the left longitudinal beam 14, the detection device has a compact structure and a reasonable space utilization, and also provides a certain degree of protection for the swing transmission mechanism 5 so as to ensure the operation stability of the swing transmission mechanism 5.

In a further solution, the handwheel 34 may be provided with a pointer 37, and a dial 35 coaxial with the pointer 37 may be arranged at a rear portion of the handwheel 34. A transmission ratio of the first bevel gear assembly 19 consisted of the first bevel gear and the second bevel gear is the reciprocal of a transmission ratio of the second bevel gear assembly 31, and a transmission ratio of each universal joint 29 is 1.

With such structure, when an operator manually rotates the handwheel 34, the rotating angle can be controlled well according to the position of the pointer 37 on the dial 35, and since the transmission ratio of the first bevel gear assembly 19 is the reciprocal of the transmission ratio of the second bevel gear assembly 31, and the transmission ratio of each universal joint 29 is 1, i.e., a transmission ratio of the entire swing transmission mechanism 5 is 1, the rotated angle of the handwheel operated by the operator is equal to the rotating angle of the horizontal rotating beam 6 in the horizontal plane. Thus, the swing transmission mechanism 5 may transfer movement smoothly and be convenient to control. Apparently, the swing transmission mechanism 5 is not limited to the above manner, and can be realized in other structural forms.

Connection manners for realizing the rotatable connection of the horizontal rotating beam 6 in the horizontal plane are described hereinabove. The connection manner of the up and down movable receiving disc 26 of the detection device is described hereinafter.

Figure 7:
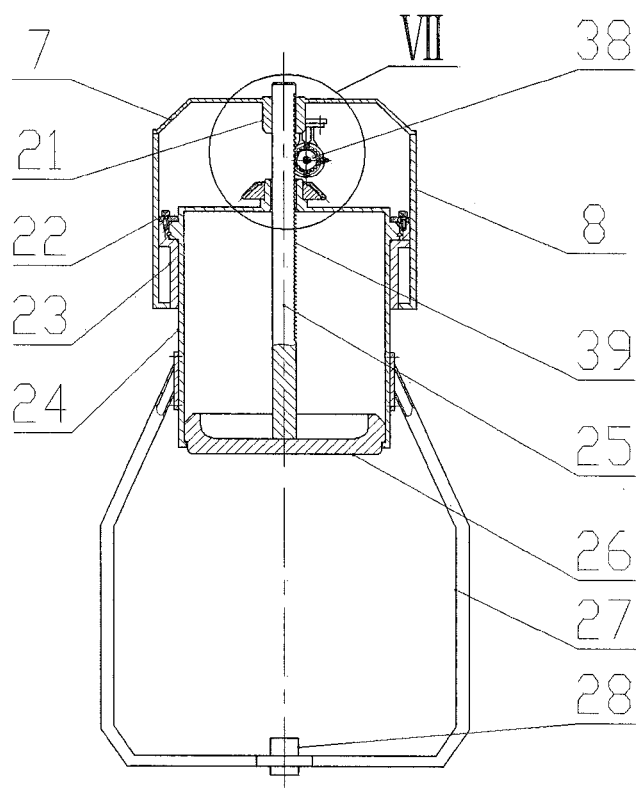
FIG. 7 is a sectional view taken along line C-C in FIG. 2.
Figure 8:
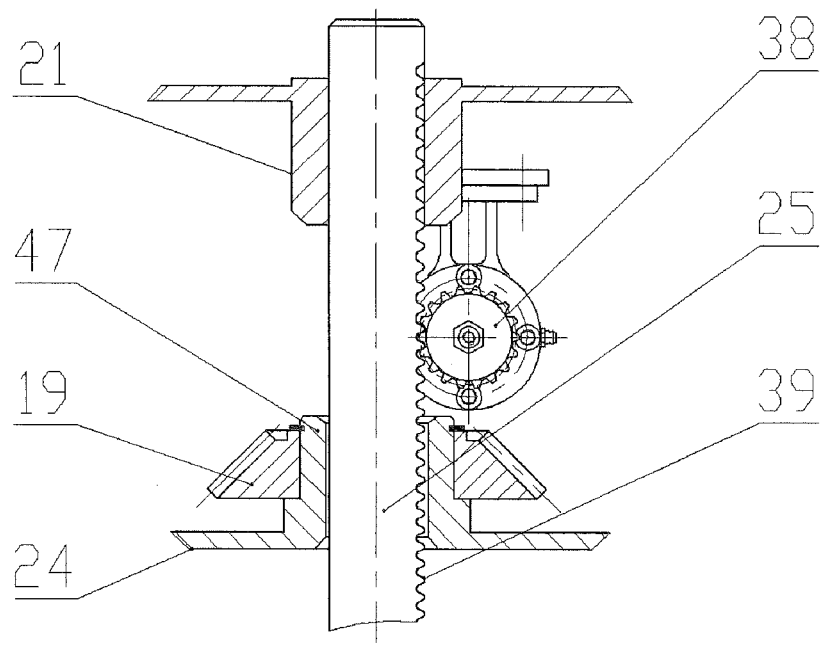
FIG. 8 is a partially enlarged view of portion VII in FIG. 7.

Reference is made to FIGS. 7 and 8, FIG. 7 is a sectional view taken along line C-C in FIG. 2; and FIG. 8 is a partially enlarged view of portion VII in FIG. 7.

In an embodiment, as shown in Figures, an upper portion of the connecting cylinder 8 may be provided with a top cover 7, and the top cover 7 may be provided with an upper supporting sleeve 21. A sliding rod 25 is vertically slidably connected to the upper supporting sleeve 21 via a sliding key 20, and is coaxially arranged inside the rotating sleeve 24, and has a lower end portion fixedly connected to the receiving disc 26.

With such structure, when the sliding rod 25 slides up and down with respect to the connecting cylinder 8 via the sliding key 20, the receiving disc 26 fixedly connected to the sliding rod 25 may be driven to move up and down, thereby facilitating the detection device to locate the focus position of the reflecting surface 13 of the concentrator accurately.

Regarding the above transmission mechanism for realizing the vertical movement, in a solution, a rack 39 may be arranged on the sliding rod 25, and the rack 39 engages with a gear 38, and the gear 38 is connected to a lift transmission mechanism 10 of the detection device. With such structure, the lift transmission mechanism 10 of the detection device is actuated to drive the gear 38 to rotate, and the gear 38 in turn transfers the movement to the sliding rod 25 via the engaging movement between the gear 38 and the rack 39, thereby driving the receiving disc 26 to move up and down. The gear transmission mechanism may also transfer movement smoothly and be convenient to control. Apparently, transmission mechanisms of other structural forms may also be adopted herein.

The lift transmission mechanism 10 of the detection device has a structure similar to the swing transmission mechanism 5, and may include a plurality of link mechanisms arranged inside the right transverse beam 11 and the right longitudinal beam 12 and connected by universal joints. One end of the link mechanism inside the right longitudinal beam 12 is connected to a handwheel via a bevel gear assembly, and the other end thereof inside the right transverse beam 11 is connected to the above gear.

With such structure, when the receiving disc 26 is required to move vertically, it is only required to manually rotate the handwheel arranged at the right longitudinal beam 12, then the rotating force is transformed to a driving force for the gear 38 inside the right transverse beam 11 via the connecting rods connected via the universal joints, and then the rotation of the horizontal rotating beam 6 may be achieved through the engagement between the gear 38 and the rack 39.

Thus, the lift transmission mechanism 10 is convenient to operate and has a simple structure, and since all components of the lift transmission mechanism 10, except for the handwheel, are arranged inside the right transverse beam 11 and the right longitudinal beam 12, the detection device has a compact structure and a reasonable space utilization, and also provides a certain degree of protection for the lift transmission mechanism 10 to ensure its operation stability.

In a further solution, the handwheel may be provided with a pointer, and a dial coaxially with the pointer may be arranged at a rear portion of the handwheel. A transmission ratio of the gear transmission mechanism consisted of the gear 38 and the rack 39 is 1, and the transmission ratio of each universal joint 29 is also 1. Unlike the swing transmission mechanism 5, the amount indicated by this pointer 37 in this solution is a displacement.

With such structure, when the operator manually rotates the handwheel 34, the vertical displacement of the receiving disc 26 can be controlled well according to the position of the pointer 37 on the dial 35, and since the transmission ratio of the gear transmission mechanism is 1, and the transmission ratio of each universal joints 29 is 1, i.e., a transmission ratio of the entire lift transmission mechanism 10 is 1, the rotated angle of the handwheel operated by the operator may be simply transformed to the vertical displacement of the receiving disc 26. Thus, the lift transmission mechanism 10 may transfer movement smoothly and be convenient to control. Apparently, the lift transmission mechanism 10 is not limited to the above manner, and the transmission ratio of the lift transmission mechanism 10 is not limited to 1, and other structural forms and other transmission ratios may also be adopted.

Regarding structural forms for mounting the camera 28 below the receiving disc 26, in a solution, a camera holder may be connected below the receiving disc 26, and the camera 28 is mounted on the camera holder 27. With such structure, a vertical height of the camera 28 may be adjusted by adjusting a vertical height of the camera holder 27, thus the camera 28 may be mounted and dismounted conveniently.

Figure 9:
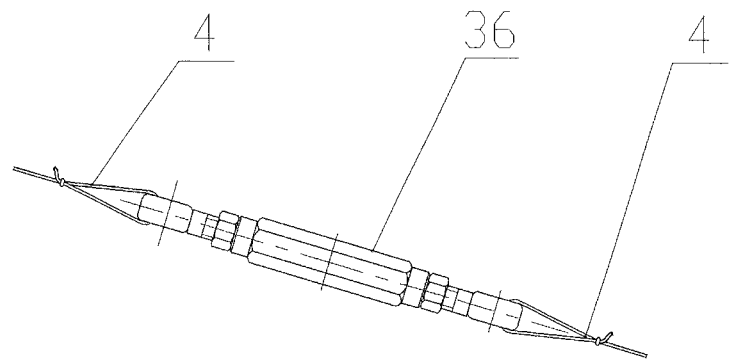
FIG. 9 is a partially enlarged view of portion IV in FIG. 1.
Figure 10:
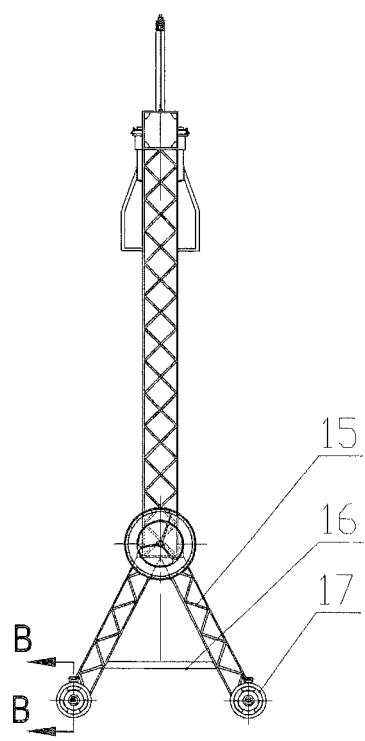
FIG. 10 is a view seen in a direction of A in FIG. 1.

The fixedly supporting manner of the door-shaped frame consisted of the transverse beams and the longitudinal beams may be further arranged. Reference is made to FIG. 9, which is a partially enlarged view of portion IV in FIG. 1.

In another embodiment, as shown in FIG. 9, each of the left transverse beam 3 and the right transverse beam 11 may be provided with a pulling cord holder 2, and the pulling cord holder 2 may be provided with a pulley assembly 1. Both ends of each of the left transverse beam 3 and the right transverse beam 11 are connected with a pulling cord 4 via the pulley assembly 1, and the pulling cord 4 is tensioned via a tensioner 36.

With such structure, the horizontal straightness and rigidity of each of the left transverse beam 3 and the right transverse beam 11 may be ensured by the tensioning effect of the pulling cord 4. The tensioning device 36 may be a rigging turnbuckle, and when the pulling cord 4 is required to be further tensioned, the tensioning of the pulling cord 4 may be achieved by simply rotating a nut on the rigging turnbuckle. The horizontal straightness and rigidity of each of the left transverse beam 3 and the right transverse beam 11 are ensured by the pulling force on each of the left transverse beam 3 and the right transverse beam 11 from two ends of the pulling cord 4. Apparently, the tensioning device 36 may also have other structural forms.

Figure 11:
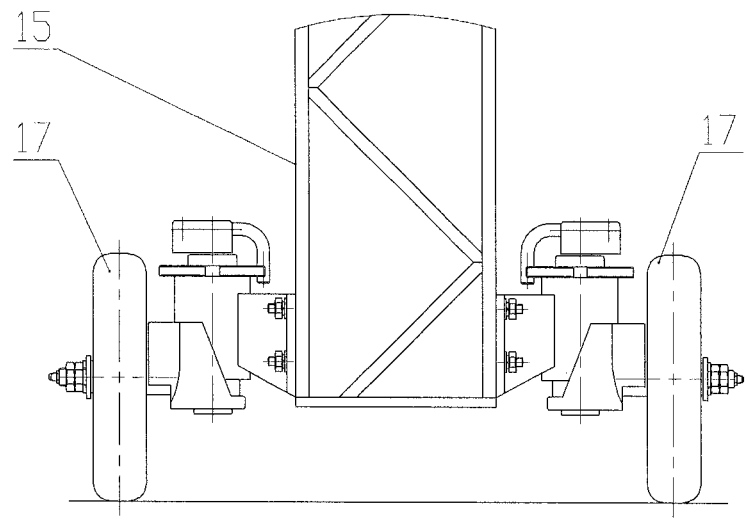
FIG. 11 is a partially enlarged view of portion III in FIG. 1.
Figure 12:
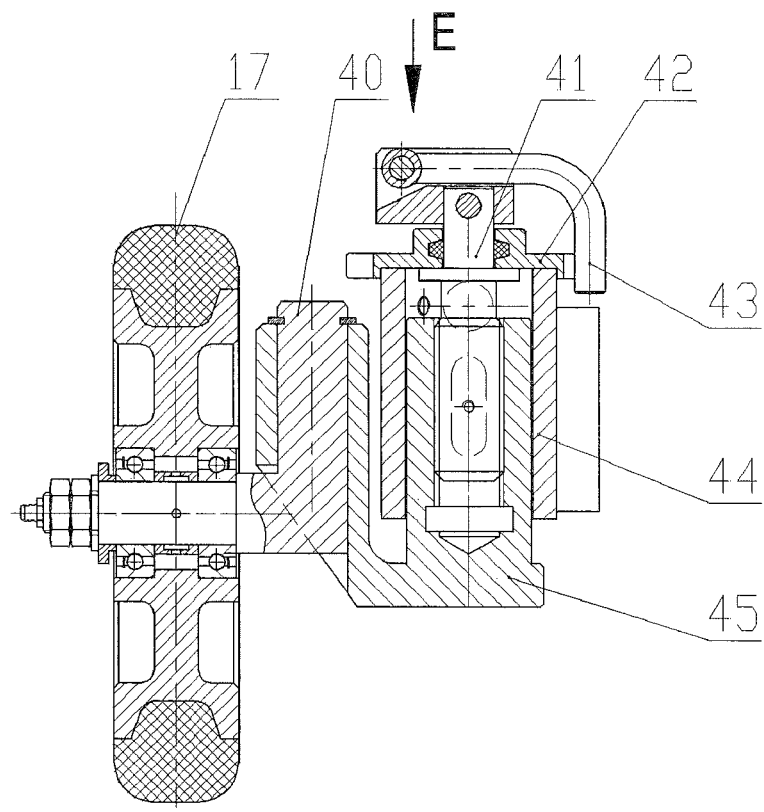
FIG. 12 is a sectional view taken along line B-B in FIG. 10.
Figure 13:
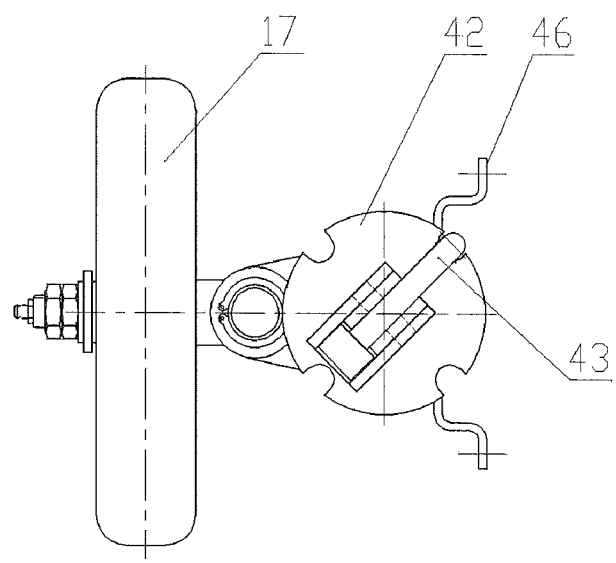
FIG. 13 is a view seen in a direction of E in FIG. 12.

Structural forms for supporting the door-shaped frame of the detection device on the ground may be further arranged. Reference is made to FIGS. 10 to 13, FIG. 10 is a view seen in a direction of A in FIG. 1; FIG. 11 is a partially enlarged view of portion III in FIG. 1; FIG. 12 is a sectional view taken along line B-B in FIG. 10; and FIG. 13 is a view seen in a direction of E in FIG. 12.

In another embodiment, as shown in Figures, each of the left longitudinal beam 14 and the right longitudinal beam 12 is supported on a herringbone beam 15, a transverse pulling rod 16 is arranged between two supporting legs of the herringbone beam 15, and two sides of a bottom end of each supporting leg are connected with two caster assemblies 17 each having an adjustable height.

With such structure, the left longitudinal beam 14 and the right longitudinal beam 12 are supported on the ground via the herringbone beam 15, which increases the supporting area and the grasping force of the door-shaped frame on the ground, and strengthens the stability of the support of the door-shaped frame. Since two sides of each supporting leg of the herringbone beam 15 is provided with the caster assemblies 17, i.e., each longitudinal beam is supported on the ground via four caster assemblies 17, thus each of the caster assemblies 17 is subjected to a uniform stress and is supported stably. When it is required to move the entire detection device by a certain distance, the entire detection device may be moved by simply moving the caster assemblies 17 to roll the casters, which increases the flexibility, the operating adaptability and reliability of the detection device. Furthermore, since the height of each of the caster assemblies 17 is adjustable, the detection device may adapt to an operating environment with unsmooth ground, which enables the entire detection device to maintain a better levelness.

In another solution, each of the caster assemblies 17 includes a floating shaft sleeve 45 having two cylindrical structures, a first cylindrical structure is fixedly connected to the caster via a caster shaft 40, a fixing sleeve 44 is vertically slidably connected to an outer portion of a second cylindrical structure, and an inner portion of the second cylindrical structure is threadedly connected with a rotating shaft 41.

With such structure, when the ground of the operating environment is not smooth, the floating shaft sleeve 45 may be lifted or lowered via the threaded connection by simply rotating the rotating shaft 41, and since the floating shaft sleeve 45 is fixedly connected to the caster, the caster is lifted or lowered accordingly, thus may adapt to the unsmooth ground better, thereby supporting the whole detection device on the ground stably.

In a further solution, an upper end of the fixing sleeve 44 may be arranged with a snap cap 42, and an upper end of the rotating shaft 41 is articulated to a rocking rod 43 via a horizontal articulating shaft, and an edge of the snap cap 42 is provided with a snap groove for snappingly mounting the rocking rod 43 when the rocking rod 43 is put down.

With such structure, when the rocking rod 43 is put down, it can be snappingly mounted at the edge portion of the snap cap 42, thus the rotating shaft 41 can not rotate, which locks the floating shaft sleeve 45, prevents it from moving up and down, and ensures it having a stationary position. When the rocking rod 43 is pulled up, the rotation of the rocking rod 43 may drive the floating shaft sleeve 45 to move up and down, which further ensures the operating stability of the caster assembly 17. Further, a mounting seat 46 for facilitating mounting the rocking rod 43 may be further arranged below the snap cap 42.

The present application further provides a solar thermal power generation system, which includes a reflecting surface 13 of a concentrator, and further includes a detection device for the reflecting surface of the concentrator as described hereinabove, and the detection device is arranged right above the reflecting surface 13 of the concentrator.

Since the detection device has the above technical effects, the solar thermal power generation system including the detection device should also have the same technical effects, which will not be described herein.

A solar thermal power generation system and a detection device for a reflecting surface of a concentrator thereof provided by the present application are described in detail hereinbefore. The principle and the embodiments of the present application are illustrated herein by specific examples. The above description of examples is only intended to help the understanding of the method and the spirit of the present application. It should be noted that, for the person skilled in the art, many modifications and improvements may be made to the present application without departing from the principle of the present application, and these modifications and improvements are also deemed to fall into the protection scope of the present application defined by the claims.

The invention claimed is:

1. A detection device for a reflecting surface of a concentrator of a solar thermal power generation system, comprising a horizontal rotating beam arranged above the reflecting surface of the concentrator and rotatable in a horizontal plane, wherein a bottom end of the horizontal rotating beam is provided with a plurality of laser heads, and a receiving disc, which is perpendicular to a central axis of the horizontal rotating beam and movable up and down, is connected to the horizontal rotating beam at a position corresponding to a theoretical focus position of the reflecting surface of the concentrator, and a camera is arranged below the receiving disc; and wherein, the horizontal rotating beam comprises a rotating sleeve arranged at a middle portion of the horizontal rotating beam and a main beam fixedly connected between two sides of the horizontal rotating beam, an upper end of the rotating sleeve is connected to a connecting cylinder and rotatable with respect to the connecting cylinder in the horizontal plane, and a left transverse beam and a right transverse beam are respectively arranged at two sides of the connecting cylinder, and a left longitudinal beam and a right longitudinal beam both supported on the ground are respectively connected below an outer side of the left transverse beam and an outer side of the right transverse beam; and wherein, an upper portion of the rotating sleeve is provided with a lower supporting sleeve, a first bevel gear is arranged outside the lower supporting sleeve and engages with a second bevel gear, and the second bevel gear is connected to a swing transmission mechanism of the detection device.

2. The detection device for a reflecting surface of a concentrator of a solar thermal power generation system according to claim 1, wherein the swing transmission mechanism comprises a plurality of link mechanisms connected by universal joints and arranged inside the left transverse beam and the left longitudinal beam, one end of the link mechanism inside the left longitudinal beam is connected to a handwheel via a second bevel gear assembly, and the other end of the link mechanism inside the left transverse beam is connected to the first bevel gear.

3. The detection device for a reflecting surface of a concentrator of a solar thermal power generation system according to claim 2, wherein the handwheel is provided with a pointer, and a dial coaxial with the pointer is arranged at a rear portion of the handwheel; a transmission ratio of a first bevel gear assembly consisted of the first bevel gear and the second bevel gear is the reciprocal of a transmission ratio of the second bevel gear assembly, and a transmission ratio of each universal joint is 1.

4. The detection device for a reflecting surface of a concentrator of a solar thermal power generation system according to claim 1, wherein an upper portion of the connecting cylinder is provided with a top cover, the top cover is provided with an upper supporting sleeve, and a sliding rod is vertically slidably connected to the upper supporting sleeve via a sliding key, and is coaxially arranged inside the rotating sleeve, and has a lower end portion fixedly connected to the receiving disc.

5. The detection device for a reflecting surface of a concentrator of a solar thermal power generation system according to claim 4, wherein a rack is arranged on the sliding rod and engages with a gear, and the gear is connected to a lift transmission mechanism of the detection device.

6. The detection device for a reflecting surface of a concentrator of a solar thermal power generation system according to claim 1, wherein each of the left transverse beam and the right transverse beam is provided with a pulling cord holder, and the pulling cord holder is provided with a pulley assembly, both ends of each of the left transverse beam and the right transverse beam are connected with a pulling cord via the pulley assembly, and the pulling cord is tensioned via a tensioner.

7. The detection device for a reflecting surface of a concentrator of a solar thermal power generation system according to claim 1, wherein each of the left longitudinal beam and the right longitudinal beam is supported on a herringbone beam, a transverse pulling rod is arranged between two supporting legs of the herringbone beam, and two sides of a bottom end of each supporting leg are connected with two caster assemblies each having an adjustable height.

8. The detection device for a reflecting surface of a concentrator of a solar thermal power generation system according to claim 7, wherein each of the caster assemblies comprises a floating shaft sleeve having two cylindrical structures, and a first cylindrical structure is fixedly connected to a caster via a caster shaft; a fixing sleeve is vertically slidably connected to an outer portion of a second cylindrical structure, and an inner portion of the second cylindrical structure is threadedly connected with a rotating shaft.

9. The detection device for a reflecting surface of a concentrator of a solar thermal power generation system according to claim 8, wherein an upper end of the fixing sleeve is arranged with a snap cap, and an upper end of the rotating shaft is articulated to a rocking rod via a horizontal articulating shaft, and an edge of the snap cap is provided with a snap groove for snappingly mounting the rocking rod in a case that the rocking rod is put down.

10. The detection device for a reflecting surface of a concentrator of a solar thermal power generation system according to claim 2, wherein each of the left transverse beam and the right transverse beam is provided with a pulling cord holder, and the pulling cord holder is provided with a pulley assembly, both ends of each of the left transverse beam and the right transverse beam are connected with a pulling cord via the pulley assembly, and the pulling cord is tensioned via a tensioner.

11. The detection device for a reflecting surface of a concentrator of a solar thermal power generation system according to claim 2, wherein each of the left longitudinal beam and the right longitudinal beam is supported on a herringbone beam, a transverse pulling rod is arranged between two supporting legs of the herringbone beam, and two sides of a bottom end of each supporting leg are connected with two caster assemblies each having an adjustable height.

12. The detection device for a reflecting surface of a concentrator of a solar thermal power generation system according to claim 3, wherein each of the left transverse beam and the right transverse beam is provided with a pulling cord holder, and the pulling cord holder is provided with a pulley assembly, both ends of each of the left transverse beam and the right transverse beam are connected with a pulling cord via the pulley assembly, and the pulling cord is tensioned via a tensioner.

13. The detection device for a reflecting surface of a concentrator of a solar thermal power generation system according to claim 3, wherein each of the left longitudinal beam and the right longitudinal beam is supported on a herringbone beam, a transverse pulling rod is arranged between two supporting legs of the herringbone beam, and two sides of a bottom end of each supporting leg are connected with two caster assemblies each having an adjustable height.

14. The detection device for a reflecting surface of a concentrator of a solar thermal power generation system according to claim 4, wherein each of the left transverse beam and the right transverse beam is provided with a pulling cord holder, and the pulling cord holder is provided with a pulley assembly, both ends of each of the left transverse beam and the right transverse beam are connected with a pulling cord via the pulley assembly, and the pulling cord is tensioned via a tensioner.

15. The detection device for a reflecting surface of a concentrator of a solar thermal power generation system according to claim 4, wherein each of the left longitudinal beam and the right longitudinal beam is supported on a herringbone beam, a transverse pulling rod is arranged between two supporting legs of the herringbone beam, and two sides of a bottom end of each supporting leg are connected with two caster assemblies each having an adjustable height.

16. A solar thermal power generation system, comprising a reflecting surface of a concentrator and further comprising the detection device for a reflecting surface of a concentrator, wherein the detection device is arranged right above the reflecting surface of the concentrator, and comprises a horizontal rotating beam arranged above the reflecting surface of the concentrator and rotatable in a horizontal plane, a bottom end of the horizontal rotating beam is provided with a plurality of laser heads, and a receiving disc, which is perpendicular to a central axis of the horizontal rotating beam and movable up and down, is connected to the horizontal rotating beam at a position corresponding to a theoretical focus position of the reflecting surface of the concentrator, and a camera is arranged below the receiving disc; and wherein, the horizontal rotating beam comprises a rotating sleeve arranged at a middle portion of the horizontal rotating beam and a main beam fixedly connected between two sides of the horizontal rotating beam, an upper end of the rotating sleeve is connected to a connecting cylinder and rotatable with respect to the connecting cylinder in the horizontal plane, and a left transverse beam and a right transverse beam are respectively arranged at two sides of the connecting cylinder, and a left longitudinal beam and a right longitudinal beam both supported on the ground are respectively connected below an outer side of the left transverse beam and an outer side of the right transverse beam; and wherein, an upper portion of the rotating sleeve is provided with a lower supporting sleeve, a first bevel gear is arranged outside the lower supporting sleeve and engages with a second bevel gear, and the second bevel gear is connected to a swing transmission mechanism of the detection device.

* * * * *